Patented Sept. 14, 1954

2,689,171

UNITED STATES PATENT OFFICE 2,689,171

IDENTIFYING GASOLINE AND THE LIKE

Karl F. Hager, Fort Bliss, and Morris Rosenthal, El Paso, Tex., assignors, by direct and mesne assignments, to the United States of America as represented by the Secretary of the Army No Drawing. Application December 8, 1949, Serial No. 131,941

5 Claims. (Cl. 23—230)

This invention relates to the identification of gasoline.

An object of the invention is to provide a marked or tagged gasoline which is indistinguishable in appearance and utility from ordinary gasoline but which can be positively identified by a simple test. The gasoline is thus secretly marked and is identifiable only by one who knows the manner of the marking.

Another object is to provide a process for identifying a gasoline or similar aliphatic hydrocarbon liquid containing a dissolved marking compound, which process is simple to perform and which results in rapid and positive identification of the material.

The gasoline or other hydrocarbon liquid of the invention includes as a marking material a small amount of a diazotizable primary aromatic amine dissolved therein. The liquid so marked is readily identified by extracting the amine from the liquid with an aqueous liquid, diazotizing the amine, and coupling the diazotized amine with a coupling component to form an azo dyestuff. The dyestuff is easily recognizable and serves to identify the hydrocarbon liquid with certainty.

Very small amounts of the primary aromatic amine are sufficient to mark the gasoline. Generally less than 0.01% is sufficient and 0.001% or even less is frequently enough to give a strong test.

Diazotizable amines and coupling compounds are well known. Examples of such amines are para-toluidine, aniline and the like. Coupling compounds are exemplified by β-naphthol, dimethyl-aniline, aryl amines, salicylic acid, and the like.

Example I

Fifty centimeters of commercial gasoline is marked by dissolving therein 0.001% of para-toluidine by weight of the gasoline. No apparent change in the gasoline occurs.

The amine is extracted from the gasoline by shaking the marked gasoline with 3 cc. of dilute aqueous hydrochloric acid solution in a separating funnel and separating the aqueous layer from the gasoline. The aqueous layer is diazotized with 2 drops of 10% sodium nitrite solution. The solution of diazonium compound so produced is buffered with 3 cc. of 15% sodium acetate solution. The buffered solution is then poured over a filter paper moistened over half its area with β-naphthol. A coupling reaction takes place between the diazonium compound and the β-naphthol to form a characteristic pink azo dyestuff.

Example II

Commercial gasoline is marked with 0.001% by weight of aniline.

The aniline is extracted from the gasoline, buffered, diazotized and coupled with β-naphthol, in the manner of Example I, to produce a bright orange azo dyestuff on the test paper.

Example III

As in Example II, aniline is used as the marking substance.

The aniline, when coupled with the diazotized aniline produces a bright yellow dyestuff.

It may be noted that when commercial gasoline, to which no marking compound has been added, is treated in the same manner as described in the example, the characteristic color formations described do not occur on the filter paper.

We claim:

1. The method of identifying an aliphatic hydrocarbon liquid secretly marked by dissolving therein between about 0.001% and 0.01% by weight of an aromatic diazotizable amine which comprises extracting said liquid with an aqueous acid solution, adding sodium nitrite to the extracted solution to diazotize the amine, buffering with sodium acetate and reacting the nitrite-containing solution with a coupling component to form an azo dye.

2. The method of claim 1 in which the amine is selected from the group consisting of para-toluidine and aniline.

3. The method of claim 1 in which the coupling compound is selected from the group consisting of β-napthol, dimethylaniline, aryl amines and salicylic acid.

4. The method of subsequently identifying and tracing a liquid hydrocarbon which comprises adding to said hydrocarbon as a marking substance between about 0.001% and 0.01% by weight of a diazotizable primary amine, the quantity of said amine being in itself insufficient to alter substantially the appearance and utility of the hydrocarbon and subsequently testing for the marking substance by extracting the amine from said hydrocarbon by means of an aqueous acid solution, diazotizing the extracted amine and coupling the diazotized amine with a coupling component to farm an azo dyestuff.

5. The method of identifying a gasoline carrying dissolved therein between about 0.001% and 0.01% by weight of an amine of the group consisting of p-toluidine and aniline, the quantity of said dissolved amine being in itself insufficient to substantially alter the appearance and utility of the gasoline, which comprises extracting the amine from the gasoline by means of an aqueous acid solution, diazotizing the extracted amine in solution, buffering the diazotized solution with sodium acetate and coupling the diazotized amine with β-naphthol to produce a characteristic colored dyestuff.

References Cited in the file of this patent

UNITED STATES PATENTS

| Number | Name | Date |
|---|---|---|
| 1,571,862 | Midgeley | Feb. 2, 1926 |
| 1,605,663 | Kettering et al. | Nov. 2, 1926 |
| 1,606,431 | Hamby | Nov. 9, 1926 |
| 1,971,329 | Calcott et al. | Aug. 28, 1934 |
| 1,987,309 | Orelup | Jan. 8, 1935 |
| 2,109,645 | Lankelma | Mar. 1, 1938 |
| 2,224,904 | Elley et al. | Dec. 17, 1940 |
| 2,265,196 | Riley | Dec. 9, 1941 |
| 2,331,573 | Sheftel | Oct. 13, 1943 |

FOREIGN PATENTS

| Number | Country | Date |
|---|---|---|
| 366,310 | Great Britain | Nov. 18, 1931 |

OTHER REFERENCES

Sachanen: "Chemical Constituents of Petroleum," Reinhold Publishing Corp., New York, N. Y., 1945, pages 375–383.